J. W. DREW.
Wheel-Vehicle.
No 59,194.
Patented Oct. 30, 1866
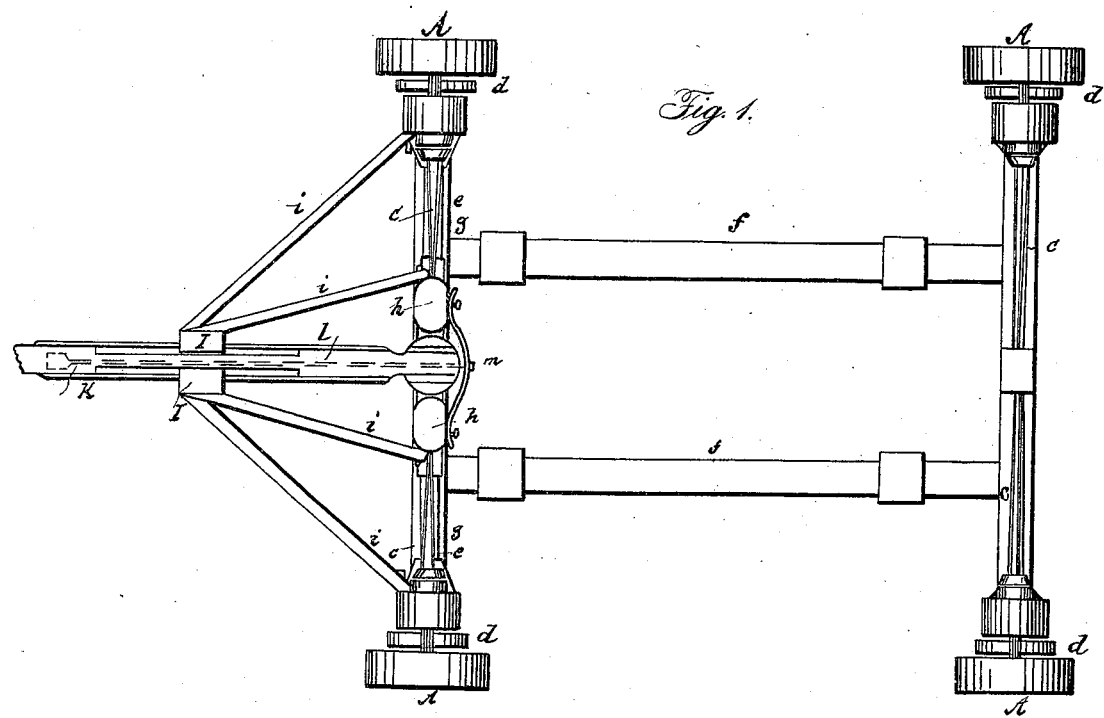
Witnesses:
Inventor:

UNITED STATES PATENT OFFICE.

JAMES W. DREW, OF WATERLOO, MICHIGAN.

IMPROVEMENT IN WHEEL-VEHICLES.

Specification forming part of Letters Patent No. 59,194, dated October 30, 1866.

*To all whom it may concern:*

Be it known that I, J. W. DREW, of Waterloo, county of Jackson, State of Michigan, have invented a new and useful Improvement in Wheel-Vehicles; and I do hereby declare that the following is a full and exact description of the same, reference being had to the accompanying drawing, forming a part of this specification, in which—

Figure 1 represents an inverted plan of my invention.

A represents a wagon or a four-wheel vehicle, supported by a wheel at either corner, and each of those wheels A A A A is furnished with an independent axle of its own, and those axles $c\ c\ c\ c$ have their main bearings on friction-wheels $d\ d\ d\ d$ next to the large wheel A.

The body of this wagon is constructed very strong and simple. Each bolster $e\ e$ is furnished with two reaches, $f\ f$, and when put together they lap onto one another, and are held by a clasp reaching around them and bolted together. Those double reaches are made in this manner so as to lengthen them out.

This manner of constructing the body of a wagon takes off all the side motion of the tongue when passing over obstructions that sometimes lie in their path, and which are very annoying to a horse, and which greatly fatigue a team when on very rough roads. A wagon-body made in this way obviates the rap of the tongue, and makes the load much easier for a team on rough roads and on sideling places, as it is not so liable to upset when cramping or turning around in the woods over logs or sideling hills; but its construction forbids cramping in ordinary manner. Consequently it has become necessary to use the divided axles $cc$ on the front end of the wagon; and in order to support those axles $cc$ strongly when swung out to allow turning the wagon, the sway-bar $g$ has been thereunto affixed, and boxes $h\ h$ have therefore been placed upon the bar $g$ in a manner that allows them to slide toward the outer end of its bar for the convenience of the axles $c\ c$ when in the act of turning, as clearly shown in drawing No. 1. This operation is effected very simply by the braces $i\ i\ i\ i$ projecting directly from each end of the axles $c\ c$ to boxes $j\ j$, properly attached to the tongue $k$ to allow them to slide either way when turning about the wagon, for the convenience of its operating properly with the other described parts.

The tongue $k$ is furnished with a support, $l$, to prevent the weight of the switch end bearing upon the horses' necks, which is very tiresome to a team, especially when carrying a heavy one, as on heavy lumber-wagons and constant teaming. This support is furnished with a spring, $m$, so that it may be borne down if necessary, and to make it easy in its manner of moving. It is necessary that the support $l$ should have one or more joints in it, so that it may move about with the tongue $k$. It may be made of a rod, or a chain or cable. The axles $c\ c$ have an extra box, $n$, which fits into sliding box $h$, and turns as the box $h$ slides out upon the bar $g$.

Having thus described my invention, what I claim, and desire to secure by Letters Patent, is—

1. The sliding boxes $h\ h$, constructed and operating as and for the purpose herein set forth.

2. The tongue-support $l$, in combination with spring $m$, constructed and operating substantially as herein specified.

3. The spring-bars $g\ g$, boxes $h\ h$, tongue-support $l$, spring $m$, and boxes $h\ h$, the whole constructed and arranged substantially as herein described.

JAMES W. DREW.

Witnesses:
S. M. DEWEY,
M. A. DEWEY.